Aug. 9, 1927.
J. G. LE PERE
1,638,493
CORN POPPER
Filed Jan. 6, 1925
2 Sheets-Sheet 1
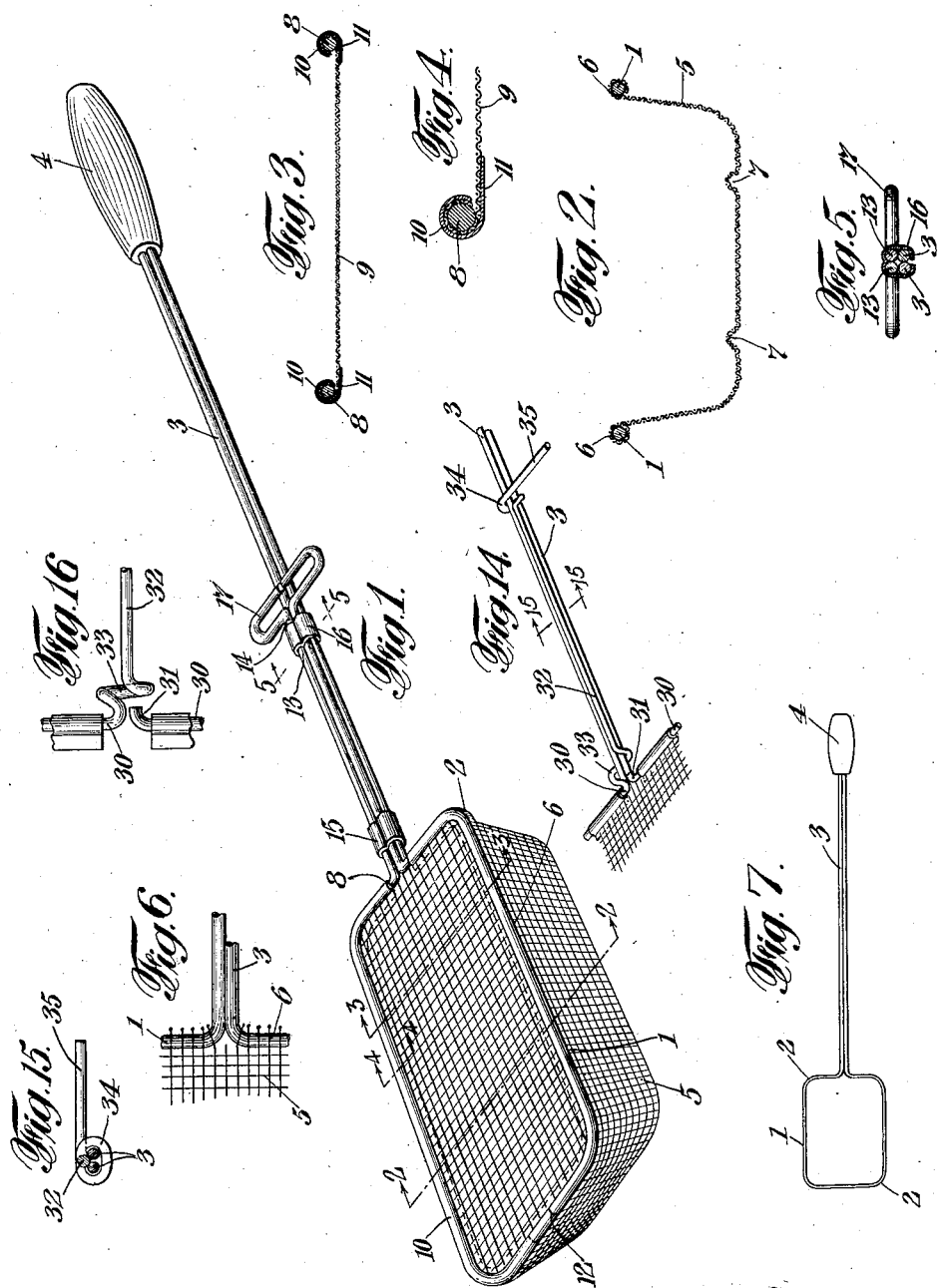

Aug. 9, 1927.
J. G. LE PERE
1,638,493
CORN POPPER
Filed Jan. 6, 1925
2 Sheets-Sheet 2
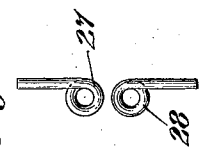
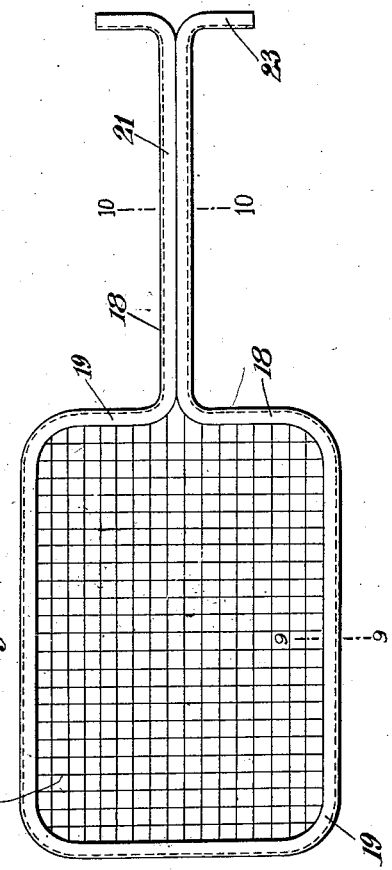
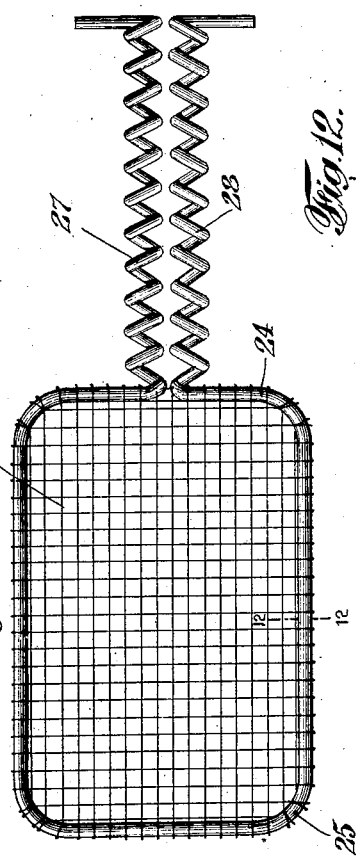
Inventor
John G. LePere,
By his Attorneys
Pringle, Wright, Neal & Bean.

Patented Aug. 9, 1927.

1,638,493

UNITED STATES PATENT OFFICE.

JOHN G. LE PERE, OF DECATUR, ILLINOIS, ASSIGNOR TO U. S. MANUFACTURING CORPORATION, OF DECATUR, ILLINOIS, A CORPORATION OF ILLINOIS.

CORN POPPER.

Application filed January 6, 1925. Serial No. 822.

This invention relates to an improvement in corn poppers and similar devices and has for its object the provision of a simply constructed device of this character which is strong and capable of long use without destruction and distortion and which is convenient to manipulate and operate.

To the accomplishment of the foregoing and such other objects as may hereinafter appear this invention consists in the construction, combination and arrangement of parts hereinafter described and then sought to be defined in the appended claims, reference being had to the accompanying drawings forming a part hereof, which show, merely for the purpose of illustrative disclosure, a preferred embodiment as well as some modifications of this invention, it being expressly understood, however, that various changes may be made in practice within the scope of the claims without digressing from my inventive idea.

In the drawings—

Figure 1 represents a general perspective view of a device constructed according to my invention.

Figure 2 is a transverse cross section through the receptacle or basket itself taken substantially on line 2—2 of Figure 1.

Figure 3 is a transverse cross section of the cover itself taken substantially on line 3—3 of Figure 1.

Figure 4 is an enlarged transverse cross section of one edge of the cover taken on line 3—3 of Figure 1.

Figure 5 is a transverse cross section of the handle construction taken substantially on line 5—5 of Figure 1 and looking in the direction of the arrow.

Figure 6 is an enlarged plan view of the handle member where it starts to form the frame for the basket or receptacle at that point.

Figure 7 is a diagrammatic plan view of the handle and frame for the basket and receptacle.

Figure 8 is a top plan view of another form of cover and operating handle construction, Figure 9 being a transverse cross section on the line 9—9 of Figure 8 and Figure 10 being a transverse cross section on the line 10—10 of Figure 8.

Figure 11 is a top plan view of still another form of cover and operating handle construction.

Figure 12 is a transverse section of line 12—12 of Figure 11.

Figure 13 is an end elevation of the operating handle construction from the right hand end of Figure 11.

Figure 14 is a perspective view of part of the handle and a modified form of operating member for the lid or cover.

Figure 15 is a cross section taken on line 15—15 of Figure 14.

Figure 16 is an enlarged plan view of the operating member and the part of the cover construction where it joins the operating member, of the construction shown in Figure 14.

Referring first to Figures 1 to 7 inclusive, the numeral 1 designates the main frame member of the device. This frame member is formed in a sort of rectangular loop having rounded corners as indicated at 2 and has the two free end portions extending parallel to each other to form the handle 3 which has the gripping member 4 secured to the extremity thereof. This frame and handle member are preferably formed in one piece and of wire and the frame for the basket or receptacle is of the size required and the handle 3 is of sufficient length for the purposes of manipulation and operation. The handle, being formed of two strands of wire, will be of sufficient strength to hold the basket or receptacle. The basket or receptacle 5 is formed of woven wire or other reticulated or perforated material which has its edges curled or turned around the frame part 2 as at 6, as clearly shown in Figures 2 and 6 of the drawing. The bottom of the basket or receptacle may be formed with a plurality of ridges 7 for the purpose of strengthening the same and for possible decorative or identification purposes. These ridges may be of any shape or form desired.

The cover or lid for the basket or receptacle is formed by means of a frame 8 similarly shaped to the frame part 2 previously described, which frame 8 has the wire cloth 9 or other suitable reticulated or perforated material secured thereto by curling or turning its edges therearound as clearly shown in Figures 3 and 4 of the drawing and having sheet metal binding strips 10 turned or clamped therearound, as also shown in Figures 1, 3 and 4. These sheet metal binding strips are of sufficient size to provide an extended or flat sliding or bearing portion 11 which rests on the sides of the frame of the basket or receptacle. The metallic binding strips are formed in two parts which overlap as at 12 at some suitable part of the frame.

The operating handle is preferably formed integrally with the frame for the lid or cover and in the preferred construction the two end portions 13 thereof are extended in parallel over the handle 3 of the corn popper proper. These end portions 13 are swedged or otherwise indented or bent as at 14 and thereby adapted to receive the clip members 15 which are movably positioned around the two strands forming the handle 3. The extremities of the wires or rods forming the handle for the lid or cover are looped or bent laterally upon themselves as at 16, thereby forming lateral extensions 17 on each side of the handle of the corn popper. These lateral extensions 17 provide means for manipulating the lid or cover and the sliding clips 15 provide stops to engage the handle or gripping member to limit the opening movement of the lid or cover and engage the frame 2 of the basket or receptacle to limit the closing movement of the lid or cover.

It is seen that the device in the position shown in Figure 1 is closed and ready for operation and when it is desired to open the same, the lateral extension 17 is pulled, which will result in sliding the lid or cover from off the basket or receptacle and along the handle 3, and when it is desired to close the basket or receptacle, the lateral extension 17 is pushed to move the lid or cover over the basket or receptacle.

In Figure 8 of the drawing a modification of the lid and operating handle construction is illustrated. In this construction the frame for the lid or cover and the operating handle is formed of thin sheet metal 18 and is shaped to provide the frame part 19 for the lid or cover 20 and the operating handle part 21. This sheet metal frame part 18 is first rolled into U-shape for its entire length and the material forming the cover or lid 20 is clamped as at 22 (Figure 9) between the compressed sheet metal frame part. The two parts of the frame member 18 which form the operating handle part 21 of this construction are curved or bent around the two wire members which form the handle 3 of the main frame construction as indicated in Figure 10 of the drawing. The extremity of each of these members is bent laterally as at 23 to form a manipulating means, one on each side of the last handle construction.

Figures 11, 12 and 13 illustrate another modification in which the frame for the lid or cover and the operating handle is formed of the wire 24 bent in substantially rectangular shape with rounded corners as at 25 to receive the lid or cover material 26. The end portions of this frame member 24 are extended parallel to each other and coiled as at 27 to provide an extended guideway or conduit to receive the parallel members of the handle 3 of the main frame. The extremity of each of these frame members 27 is bent laterally as at 28 to form manipulating and operating means.

Another construction of the form of the handle for the lid or cover is illustrated in Figures 14, 15 and 16. In this construction 30 designates the frame for the lid or cover and the handle therefor is formed integrally therewith, one end of the wire member terminating at 31 while the other end portion 32 is extended to form the operating handle itself. This is formed with the loop or eye 33 near the beginning of the frame and is then extended in a straight line to a point near its extremity where it is formed with a second loop or eye 34 and terminates in a laterally extending member 35. These loops or eyes 33 and 34 form means to receive the handle 3 which therefore slidably supports the operating handle 31. The lateral extension 35 provides means for manipulating the lid or cover and the loop 34 provides a stop to limit the opening movement of the lid or cover and the loop 33 provides a stop to limit the closing movement of the lid or cover.

It is understood that in each of these constructions the parts are bent where necessary at the junction between the operating handle and the lid or cover so as to permit the lid or cover to move and assume a tight position relative to the basket or receptacle.

What I claim is:—

1. A device of the character described, including in combination, a main frame member having one part formed with a loop, and a basket or receptacle secured to and carried by said loop, the latter forming a marginal frame for the basket or receptacle, said main frame member also having a pair of members extending parallel from the loop and arranged close to each other to form a handle and a gripping member at the end of the handle, a frame for a lid or cover and an operating handle formed with an open loop, and material secured thereto to form a lid or cover said last mentioned frame having a portion extending along said handle and provided with means for guiding the same relative to said handle.

2. A device of the character described, including, in combination, a main frame member having one part formed with a loop, and a basket or receptacle secured to said loop, the latter forming a marginal frame for the basket and extending entirely around the upper edges thereof, said main frame member also having a pair of parallel members extending from the loop close to each other to form a handle and a gripping member at the end of the handle, a frame for a lid or cover and an operating handle formed with an open loop and material secured thereto to form a lid or cover, said last mentioned frame having a portion extending along said handle and provided with means for guiding the same relative to said handle, and means on said last mentioned frame for limiting the opening and closing movements of the frame and its attached lid or cover.

3. A device of the character described, including in combination, a basket or receptacle, and a handle attached thereto, a lid or cover for said basket or receptacle and a one piece member forming a marginal frame for the lid or cover and extending around the edges thereof and having an operating handle, said operating handle being slidably mounted on said first mentioned handle.

4. A device of the character described including, in combination, a basket or receptacle and a handle attached thereto, a lid or cover for said basket or receptacle and a one piece member forming a marginal frame for and extending around the edges of a lid or cover and having a portion extended to form an operating handle, the extremity of said extended portion being turned laterally to form manipulating means and said extended portion being slidably mounted on the first mentioned handle.

5. A device of the character described, including in combination, a basket or receptacle and a handle attached thereto, a lid or cover for said basket or receptacle and a one piece member forming a marginal frame for and extending around the edges of the lid or cover and having a portion extended to form an operating handle, the extremity of said extended portion being turned laterally to form manipulating means and said extended portion being slidably mounted on said first mentioned handle and being formed with abutment means near each end to limit the opening movement and the closing movement of the lid or cover.

6. A device of the character described, including in combination, a one piece frame and handle member formed with a marginal loop and with parallel parts extending from the loop and forming the handle, a basket or receptacle attached at the top edges to said loop and carried by the latter, a second combined frame and handle member also formed with a loop and a lid or cover secured at its edges to said loop, said handle member being in the form of an extended portion and having means for slidably engaging said first mentioned handle and provided with a lateral extension to provide manipulating means.

7. A device of the character described, including, in combination, a one piece frame and handle member formed with a marginal loop and with parallel parts which extend from the loop and form the handle, a basket or receptacle attached at its upper edges to said loop, a second combined frame and handle member also formed with a loop and a lid or cover secured to said loop, said handle member being in the form of an extended portion and having means for slidably engaging said first mentioned handle and provided with a lateral extension to provide manipulating means, said last mentioned handle also having abutments for limiting the opening and closing movements thereof.

8. A device of the character described, including in combination, a main frame having one part formed with a marginal loop and a basket or receptacle secured at the upper edges to said loop, said main frame member also having a pair of parallel members extending from the loop and close to each other to form a handle and a gripping member at the other end of the handle maintaining the said extended parallel members in parallelism, a frame for a lid or cover and an operating handle formed integral with the said frame and provided with an open loop and material secured thereto to form a lid or cover, said last mentioned frame having portions extending in parallelism with said handle, and a pair of devices embracing the parallel handle portions and the parallel extending portions of the lid or cover frame member to guide the latter relative to the handle portions and also to limit the opening and closing movements of the lid or cover.

9. A device of the character described, including, in combination, a basket or receptacle and a handle consisting of a marginal frame attached to the basket or receptacle at the upper edges thereof, a lid or cover for said basket or receptacle and a lid or cover frame attached to the lid or cover at the marginal edges thereof and extended therefrom to form an operating handle adapted to slidably overlie the first mentioned handle, and a pair of devices embracing both of said handles to maintain them in parallelism and for guiding the lid or cover handle on the receptacle or basket handle.

10. A device of the character described, including, in combination, an open frame member including a marginal loop and a handle comprising parallel members extending from the said loop, foraminated material secured at its edges to the loop and formed to provide a receptacle or basket, a frame for a lid including a marginal loop and a handle comprising parallel members extending from said last mentioned loop forming a handle and slidable on the first mentioned handle members, and means whereby to guide the second mentioned handle members on the first mentioned handle members to open and close the receptacle or basket.

In testimony that I claim the foregoing, I have hereunto set my hand this 17th day of December, 1924.

JOHN G. LE PERE.